United States Patent [19]

Lawson et al.

[11] Patent Number: 4,600,849
[45] Date of Patent: Jul. 15, 1986

[54] FLUID-ACTIVATED MOTOR HAVING MAGNETIC PROPULSION

[76] Inventors: William J. Lawson, R.D. 1, Box 299E; Robert J. Lawson, 129 Union St., both of Milton, Del. 19968

[21] Appl. No.: 693,900

[22] Filed: Jan. 23, 1985

[51] Int. Cl.⁴ ............................................. H02K 49/00
[52] U.S. Cl. ........................................ 310/103; 91/266
[58] Field of Search ..................... 310/23, 24, 80, 103

[56] References Cited

U.S. PATENT DOCUMENTS

| | | | |
|---|---|---|---|
| 3,274,901 | 9/1966 | Yost | 91/266 X |
| 3,636,391 | 1/1972 | Hornen et al. | 310/103 X |
| 3,688,136 | 8/1972 | Salverda | 310/103 X |
| 4,196,365 | 4/1980 | Presley | 310/23 |

Primary Examiner—Donovan F. Duggan
Attorney, Agent, or Firm—B. P. Fishburne, Jr.

[57] ABSTRACT

A self-starting rotational motor capable of providing significant torque in a practical working range is disclosed. The motor employs a magnetic propelling force. The motor is based on the principle of maintaining interacting substantially perpendicular rotor and stator magnet flux fields, one within the other, without gaps or spacing around the entire circumference of the magnet stator. The rotor magnets are controlled and moved relative to the stator magnets by a mechanism whereby the perpendicular rotor and stator magnet flux fields are maintained constantly in interacting relationship to produce turning of the rotor in one direction.

12 Claims, 7 Drawing Figures

FLUID-ACTIVATED MOTOR HAVING MAGNETIC PROPULSION

BACKGROUND OF THE INVENTION

The simple objective of this invention is to provide a practical, self-starting, permanent magnet, rotational motor capable of performing significant work through a rotational shaft or the like. Heretofore, permanent magnet motors have met with only limited success in that they have not been self-starting and generally have been operable only as linear motors or actuators and not as rotational devices.

One example of a prior art permanent magnet motor is disclosed in U.S. Pat. No. 4,151,431, and it is an object of this invention to improve significantly on and render more feasible and practical a motor of the class shown in this patent.

A further object of the invention is to provide a permanent magnet motor whose circumferential sections can be multiplied to increase the working power of the motor over a wide range.

Another object of the invention is to provide a permanent magnet motor and integrated rotor magnet movement control system which is relatively simple and feasible from a manufacturing cost standpoint.

Still another object is to provide a permanent magnet motor which will operate efficiently with state-of-the-art permanent magnets including ferrite magnets, magnets formed of ceramics and other existing and future improved permanent magnets.

Other features and advantages of the invention will become apparent to those skilled in the art during the course of the following description.

DETAILED DESCRIPTION

Heretofore, permanent magnet motors of the rotary type have tended to be unworkable because of obstacles pertaining to the entering and exiting of one magnetic field into and from another field, due to magnetic repulsion or attraction between the interacting fields. A magnetic cancelling or neutralizing effect results making rotational movement in the motor impossible to achieve or negligible if achieved at all.

In the present invention, it has been discovered that the above obstacles or difficulties can be completely overcome and a fully workable permanent magnet rotary motor of a self-starting nature can be achieved. Essentially, this is accomplished in the present invention by causing mutually perpendicular interacting magnetic fields of rotor and stator permanent magnet elements to enter one another during relative rotation a substantial distance from one end of one interacting field, such as the magnetic field of a stator magnet element, and causing the two interacting fields to remain totally one within the other until the shorter of the two interacting fields substantially entirely traverses the longer magnetic field. Causing this to happen eliminates the aforementioned repelling and attracting effects between the interacting fields experienced in the prior art which negates rotation in permanent magnet motors.

It will be seen that in the present invention means is provided to maintain the necessary coactive relationship between the mutually perpendicular magnetic fields of rotor and stator magnet elements throughout a complete rotational cycle of the permanent magnet motor.

Figures 1, 2, 3:
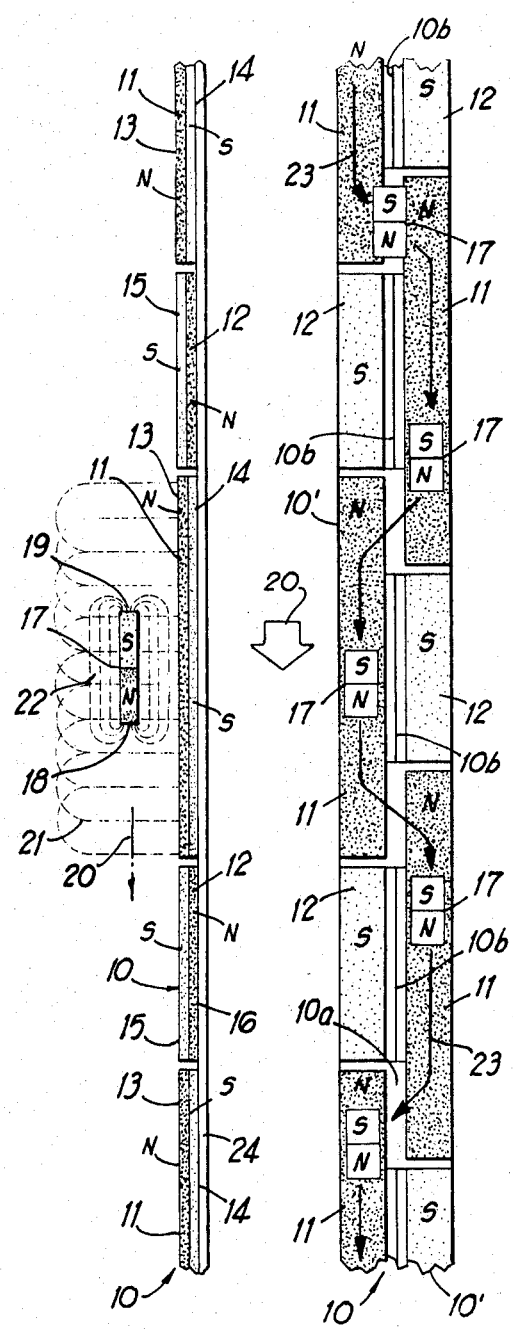
FIG. 1 is a fragmentary partly schematic axial or end view of a permanent magnet motor according to the invention with the cylindrical stator wall laid out flat for purposes of illustrating the principle of operation.
FIG. 2 is an interior side elevation of the motor with substantially the entire circumference of the stator laid out flat.
FIG. 3 is a perspective view of the stator depicted in FIGS. 1 and 2 showing the relative movement path for rotor magnets, not shown.

Referring to the drawings in detail and initially referring to FIGS. 1 and 2 which illustrate the principle of operation of the motor, a permanent magnet stator 10 is preferably formed by at least a pair of annular sections or rings 10' preferably separated by a narrow annular gap 10a. Each stator section or ring 10' is composed of at least a pair of relatively long arcuate permanent magnet stator segments 11 of equal lengths, intervened circumferentially by a like number of shorter equal length arcuate permanent magnet stator segments 12. Situated edgewise within the narrow annular gap 10a and between the stator segments 11 and 12 are magnets 10b whose magnetic fields are in opposition to both stator magnets 11 and 12, thus reducing the magnetic flux of the stator magnet segments 12 and their effect on the rotor magnets 17, as the rotor passes around stator 10.

The stator magnet segments 11 and 12 are of opposite magnetic polarities on their opposite flat faces, FIG. 1. The corresponding faces 13 of stator segments 11 are of one polarity, such as north, and their opposite faces 14 are of opposite polarities, south. The situation is reversed for the shorter magnet segments 12, whose faces 15 are of south polarity while the opposite faces 16 are of north polarity.

FIG. 1 further illustrates one coactive rotor magnet 17 in spaced relationship to the interior face of stator 10 and this permanent rotor magnet 17 possesses oppositely polarized ends 18 and 19, namely north and south poles, which respectively attract and repel magnetically with relation to the south polarized faces 15 of stator magnet segments 12. Such attraction and repulsion causes the stator magnet 10 to drive the rotor magnet 17 in rotation in the direction of the arrow 20, FIG. 1.

Also shown in FIG. 1 are mutually perpendicular interacting magnetic flux fields 21 and 22 for one of the longer stator magnet segments 11 and one rotor magnet 17. It can be seen that the magnetic field 21 extends for the full length of the magnet segment 11 and the flux lines of the field 22 are across the longitudinal axis of stator segment 11.

FIG. 2, like FIG. 3, shows the two coaxial annular stator sections or rings 10' each composed of at least a pair of the longer magnet segments 11 intervened circumferentially by a pair of the shorter segments 12. In the two annular stator sections 10', FIG. 3, the longer magnet segments 11 in each annular section are circumferentially staggered so that appreciable end portions of the segments 11 in the two annular stator sections overlap circumferentially. This overlapping relationship is shown in both FIGS. 2 and 3. This feature is essential to the continuity of rotational operation of the permanent magnet motor, as will be fully described.

Figure 6:
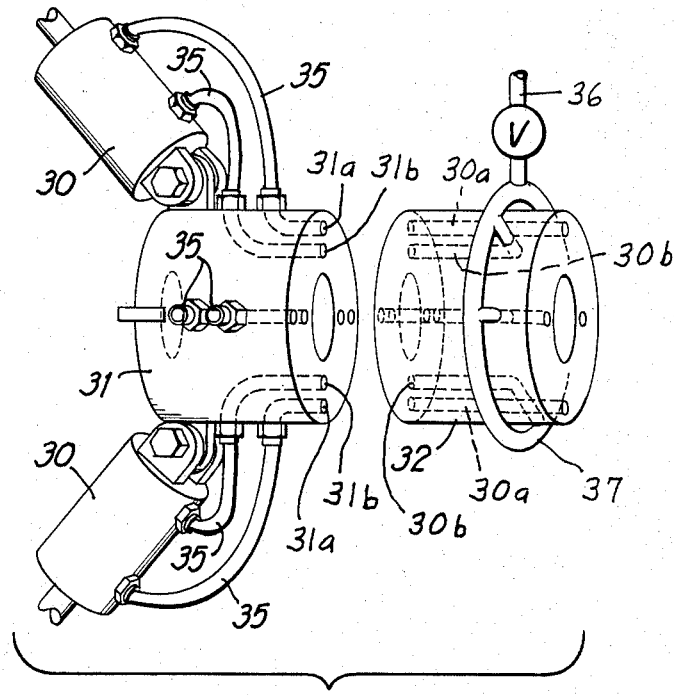
FIG. 6 is a view of the two part valve assembly shown in FIG. 4.

FIG. 2 also depicts graphically at 23 the movement path of the axially shiftable rotor magnets 17 of the motor relative to the stator magnet segments 11 and 12 during a rotational cycle. The rotor magnets are under control of a mechanical movement means, yet to be described, shown particularly in FIGS. 4 and 6. It can be seen in FIG. 2 that, while the magnet rotor is turning in the direction of arrow 20, the axially shiftable rotor magnets 17 follows the movement path 23, and in so doing, circumvent or pass around the shorter stator magnet segments 12 on a zigzag path. The same movement path 23 for the rotor magnets shown in FIG. 2 is also depicted in the stator structure of FIG. 3, although the rotor magnets are omitted from FIG. 3 for simplicity of illustration.

In the permanent magnetic motor, the stator magnet segments 11 and 12 making up the annular sections 10' of the stator 10 are mounted on the interior surface of a sized steel cylindrical stator shell 24. Any number of the annular stator sections 10' may be fixed on the stator shell 24 depending upon power requirements to be satisfied by the motor. The stator arrangement depicted in FIG. 3 results in total magnetic field circumferencing of the stator without gaps or spaces and without the rotation cancelling effects of the prior art devices which attempt to employ continuous hoop-like magnets of the same polarity.

Figure 4:
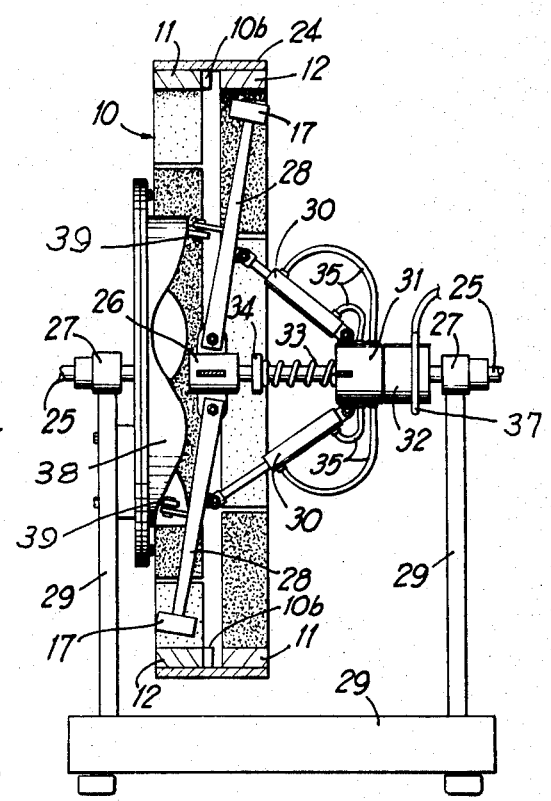
FIG. 4 is a side elevation, partly in central horizontal cross section of the permanent magnet motor and its rotor magnet, control mechanism with the latter in a run position.

Progressing to FIG. 4, a rotor hub 26 is fixed on the power shaft 25 to drive the same. The shaft 25 may be utilized to perform various forms of work. The shaft 25 is journaled in support bearings 27 on a stationary frame structure 29. The shaft extends coaxially through the stator 10 composed of shell 24 and magnet segments 11 and 12. The shaft 25 carries a multiported valve block 31 which turns with the shaft 25, but is axially movable thereon under influence of a spring 33 and fixed collar 34 on the shaft 25. The spring biases the valve block 31 axially away from the collar 34, or to the right in FIG. 4.

A companion multiported valve block 32 surrounds the shaft 25 and can be adjusted somewhat circumferentially on the shaft to advance or retard the movement of rotor magnets 17, much in the same manner that the ignition spark of an engine is advanced or retarded. The valve block 32 is held against turning with the power shaft 25.

The rotor magnets 17 are held on radial movement arms 28 which are pivoted to the hub 26 and extend generally perpendicular to the shaft 25. Pneumatic cylinders 30 interconnect the arms 28 and the rotating multiported valve block 31, as shown. The two valve blocks 31 and 32, FIG. 6, have mating ports 31a–31b and 30a–30b, respectively. One port of each pair is subjected to positive pressure while the other port of the pair is relieved of pressure so that it can exhaust air. During its rotation with the rotor structure, the valve block 31 has its ports 31a and 31b alternately pressurized and de-pressurized due to cyclic registration with the ports 30a and 30b of stationary valve block 32 which is supplied with compressed air through a supply line 36 and annular manifold 37 connected with the pressure ports 30b, FIG. 6. Air hoses 35 interconnect the ports 31a and 31b of rotating valve block 31 with mating ports of the associated power cylinders 30. This arrangement allows the rods of pneumatic cylinders 30 to extend or retract responsive to cyclical registration of the ports of the rotating and stationary valve blocks 31 and 32.

OPERATION

Assuming air pressure to be present in the supply line 36 and manifold 37, the ports 30a–30b and 31a–31b of the two valve blocks supply pressure to and exhaust air from the cylinders 30 in the required sequence. This action causes the arms 28 and rotor magnets 17 to oscillate over the interior surface of the stator 10 during motor operation. As the rotor structure turns carrying the rotatable valve block 31 and cylinders 30, at the proper times the exhaust ports 31a of valve block 31 will register with the corresponding ports of the stationary valve block 32; and the pressure ports 31b of valve block 31 will similarly register with the corresponding ports in valve block 32. The resulting reversal of the pressure and exhaust sequence causes the rods of cylinders 30 to change directions of movement, thereby causing the pivoted rotor arms 28 and rotor magnets 17 to oscillate and therefore follow the movement path 23 shown in FIG. 2 as the rotor revolves in the stator 10. Thus, the rotor magnets 17 continually traverse the stator magnets 11 on a zigzag path while circumventing the stator magnets 12, as previously described. The result is a continuous unidirectional rotation of the rotor structure of the motor.

The system is not limited to the use of air for powering the cylinders 30 and may employ other fluids, both gases and liquids. The system involving the cylinders 30 can also be vacuum operated.

Preferably, for the sake of stability of the mechanism, a fixed undulating cam plate 38 surrounding the shaft 25 may be utilized and follower elements 39 on the arms 28 between their ends engage and follow the undulations of the cam plate to more positively guide the swinging movements of the arms 28 during the rotational cycle of the rotor.

Figure 5:
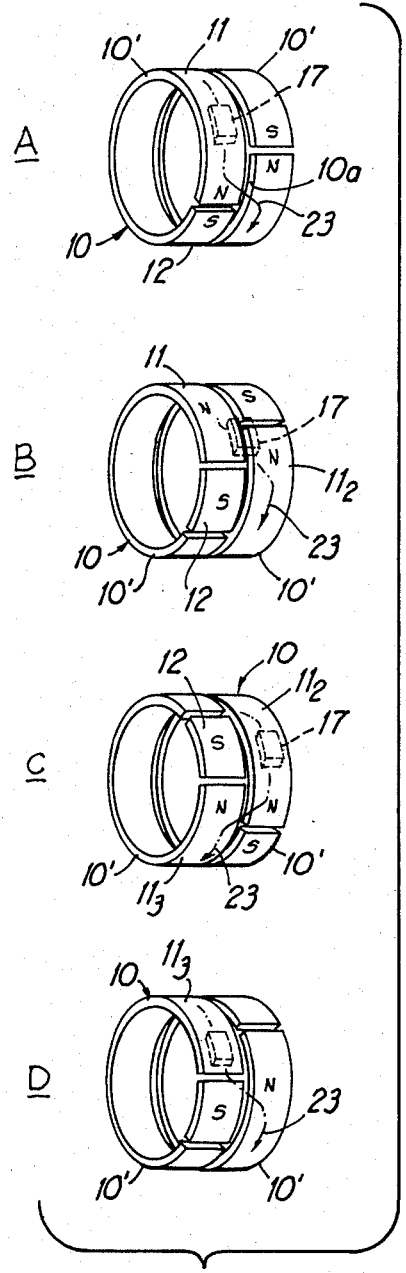
FIG. 5 is a composite, partly schematic, perspective view of the motor depicting stages of a rotational cycle thereof.

Referring to FIG. 5, position A, rotor magnet 17 is being propelled along the movement path 23 by perpendicular interaction of the two magnetic fields 22 and 21. Rotation is enhanced by the previously-described simultaneous attraction and repulsion between rotor magnet 17 and stator magnet segments 12 of opposite face polarities from the magnet segments 11.

As rotation continues along the path 23 in position A, FIG. 5, rotor magnet 17 approaches stator magnet segment $11_2$, position B, at which time ported valve block 32 aligns with valve block 31 and supplies air to a cylinder 30 causing shifting of the rotor magnet 17 above and around stator magnet segment 12 and returning it to a position over segment 11. At this time, the next oncoming rotor magnet 17 continues moving along the path 23.

As rotor rotation continues due to interaction of the mutually perpendicular fields 22 and 21, rotor magnet 17 following path 23 reaches position C, FIG. 5. At this time, ported valve blocks 31 and 32 again register causing pressurization of another cylinder 30, in turn causing another rotor magnet 17 to cross above and around a stator magnet segment 12 at the proper time between stator magnet segments 11$_2$ and 11$_3$.

As rotor rotation continues, position D, FIG. 5, is approached, thus completing one rotational cycle of the motor. The relative locations of the stator magnet segments 11 and 12 and changing locations of rotor magnets 17 allow the motor to be self-starting when the two valve blocks 31 and 32 register in the run position. Speed of rotation of the motor is controlled by rotationally adjusting the valve block 32 on the shaft 25, as previously explained, to increase or decrease the timing of the axial movements of rotor magnets 17 across the stator.

Figure 7:
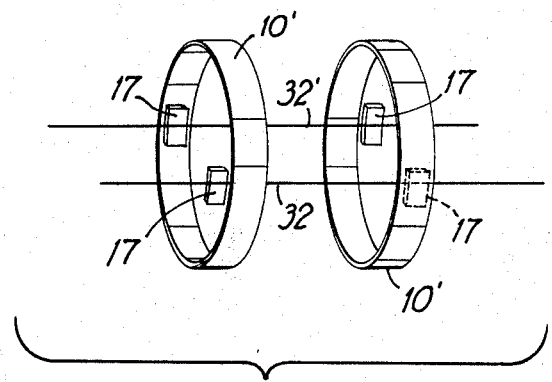
FIG. 7 is a partly schematic perspective view of axially spaced permanent magnet motor ring sections or components in accordance with a variant of the invention.

Referring to FIG. 7 of the drawings, the coaxial stator rings 10' need not be closely adjacent, as shown in the other figures. Instead, as shown in FIG. 7, the stator rings and coactive axially shiftable rotor magnets 17 may be rather widely spaced while still maintaining the desired mode of operation.

It is to be understood that the form of the invention herewith shown and described is to be taken as a preferred example of the same, and that various changes in the shape, size and arrangement of parts may be resorted to, without departing from the spirit of the invention or scope of the subjoined claims.

1. A permanent magnet motion conversion device comprising a stator consisting of a plurality of arcuate circumferentially extending and circumferentially spaced stator magnet segments having exterior and interior faces of opposite polarities, a like number of arcuate circumferentially extending stator magnet segments intervened circumferentially with the first-named stator magnet segments and forming therewith a substantially continuous annular permanent magnet stator, the second-named stator magnet segments having exterior and interior faces of opposite polarities which are the reverse of the polarities of the exterior and interior faces of the just-named stator magnet segments, at least as rotor permanent magnet adapted to coact drivingly with the stator magnet segments and having end faces of opposite polarities, said rotor magnet between its end faces extending substantially circumferentially of the stator, at least the first-named stator magnet segments and the rotor magnet having mutually perpendicular magnetic flux fields with the flux field of the rotor magnet adapted to enter and be contained wholly within the flux field of each first-named stator magnet segment, and external power means to rock the rotor magnet generally axially of the stator in near proximity to the first and second named stator magnet segments, whereby during rotor rotation the rotor magnet traverses circumferentially each first-named stator magnet segment while circumventing each second-named stator magnet segment during a full rotational cycle of the device.

2. A permanent magnet motion conversion device as defined in claim 1, and the first-named stator magnet segments having equal lengths circumferentially and being longer than the second-named stator magnet segments, the second-named stator magnet segments having equal lengths circumferentially.

3. A permanent magnet motion conversion device as defined in claim 1, and the external power means comprising fluid pressure operated power means carrying said rotor magnet.

4. A permanent magnet motion conversion device as defined in claim 3, and the fluid pressure operated power means including a radial pivoted rotor arm carrying the rotor magnet, a rotor power cylinder connected with the rotor arm to swing it on its pivot to thereby rock the rotor magnet generally axially and across the stator, and a ported valve device including rotational and fixed valve elements operatively connected with said rotor power cylinder to control extension and retraction of the latter during a rotational cycle of the device.

5. A permanent magnet motion conversion device as defined in claim 2, and said stator including a plurality of annular stator sections in coaxial relationship, each stator section having said like numbers of first and second named stator magnet segments, and the stator sections in one axial direction being successively indexed one relative to another so that the trailing ends of the first-named stator magnet segments are overlapped circumferentially with the leading ends of the first-named stator magnet segments of the next adjacent stator sections.

6. A permanent magnet motion conversion device as defined in claim 5, and a cylindrical stator shell on which all of the annular stator sections are fixedly mounted.

7. A permanent magnet motion conversion device comprising a permanent magnet stator annulus consisting of two groups of stator magnet segments with the segments of said groups arranged in alternating relationship circumferentially, the circumferential exterior and interior faces of the stator magnet segments having opposite magnetic polarities in the two groups and the polarities of the segments in one group being the reverse of the polarities of the segments in the other group, and an axially rockable rotor magnet having end faces of opposite polarities and extending substantially circumferentially of the stator annulus between the end faces, whereby during rotor rotation said rotor magnet can circumferentially traverse the stator magnet segments of one group on a zigzag path while passing around the sides of the stator magnet segments of the other group.

8. A permanent magnet motion conversion device comprising a stator consisting of at least a pair of adjacent coaxial annular stator sections, each stator section comprising a plurality of circumferentially extending and equidistantly spaced stator magnet segments having exterior and interior circumferential faces of opposite magnetic polarities, said annular stator sections being indexed so that the trailing ends of the stator magnet segments on one stator section circumferentially overlap edgewise the leading ends of the stator magnet segments of a next adjacent stator section, whereby the stator magnet segments of two adjacent stator sections define a zigzag circumferential pathway around the stator, at least one rotor magnet arranged near the circumference of the stator and having end faces of opposite magnetic polarities, the stator magnet segments and rotor magnet having mutually perpendicular magnetic flux fields of such relative sizes that the field of the rotor magnet can enter and be wholly contained in the flux field of each successive stator magnet segment of the stator along said zigzag pathway, and external power means rocking the rotor magnet substantially axially of the stator during rotor rotation so that the rotor magnet will follow said zigzag pathway while having its flux field successively entering, passing through and exiting the flux field of each stator magnet segment.

9. A permanent magnet motion conversion device as defined in claim 8, and a common stator body portion on which each annular stator section of the motor is fixedly mounted.

10. A permanent magnet motion conversion device as defined in claim 8, and said external power means comprising a fluid pressure operated power means.

11. A permanent magnet motion conversion device as defined in claim 10, and the fluid pressure operated power means including pivoted swingable arms each carrying a rotor magnet, and a power cylinder having an extensible and retractable rod coupled with each swingable arm.

12. A permanent magnet motion conversion device as defined in claim 11, and rotationally interfaced pressurized fluid distributor means connected between a source of pressurized fluid and said power cylinders.

* * * * *